Patented July 18, 1950

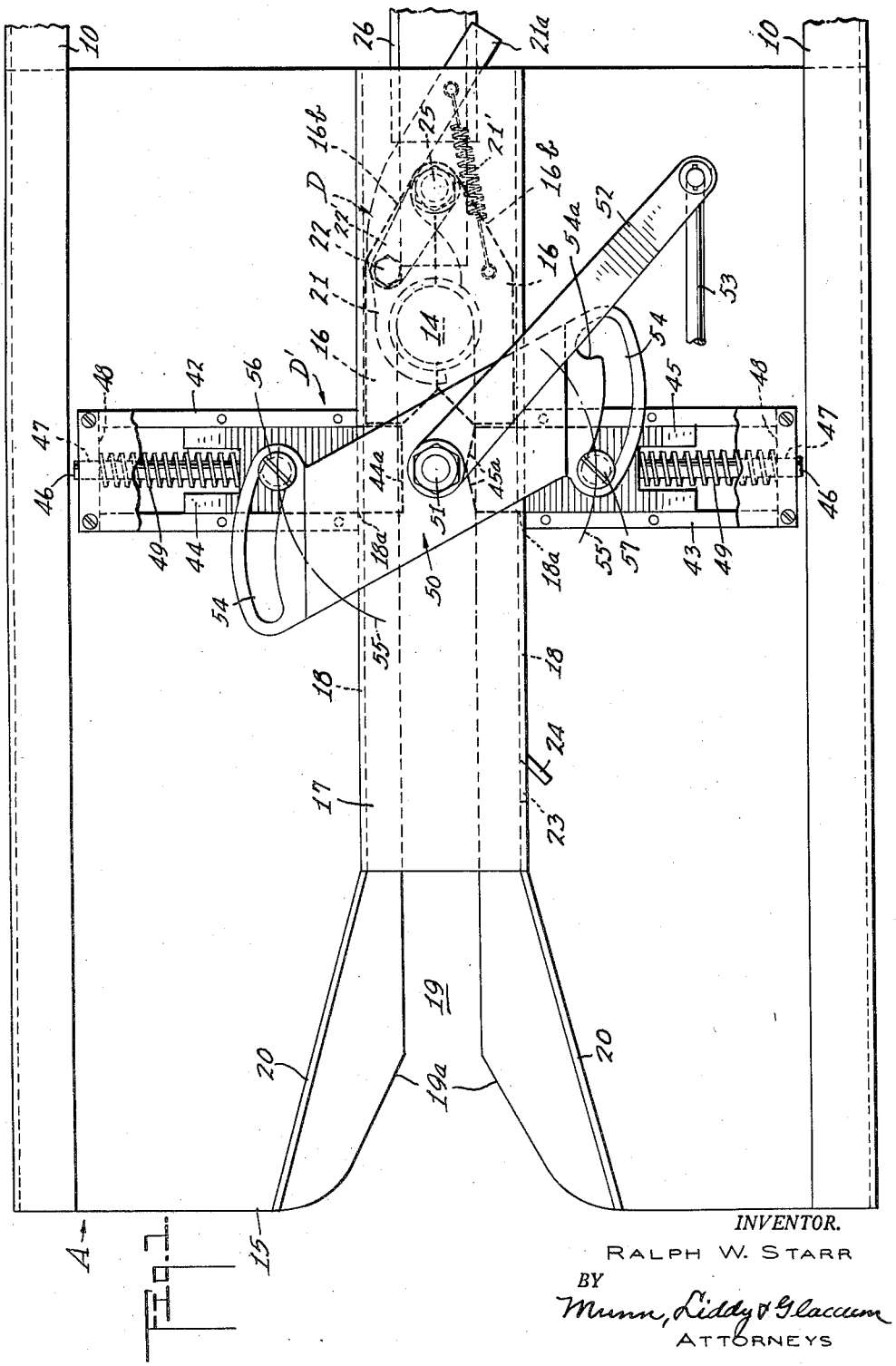

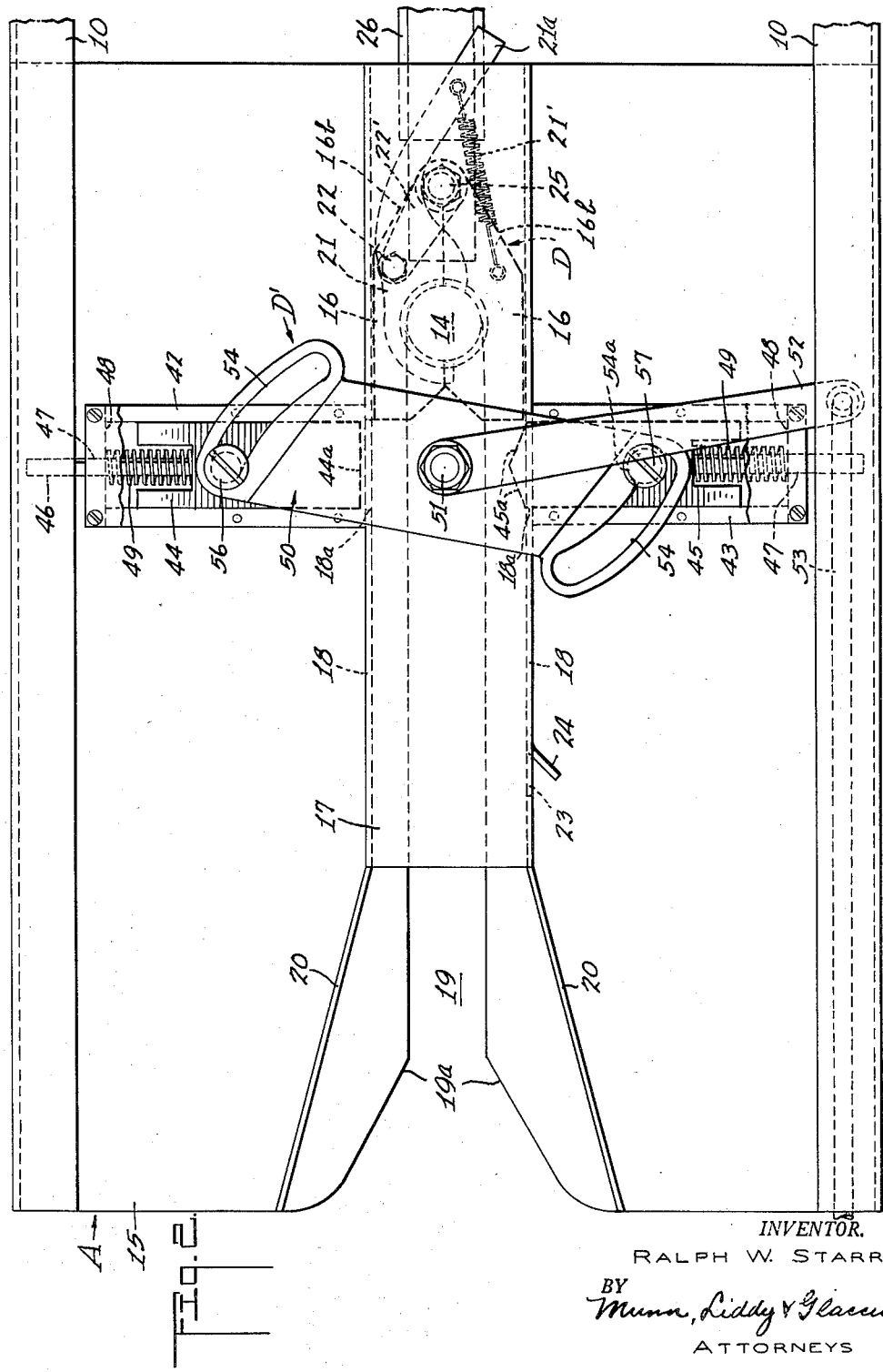

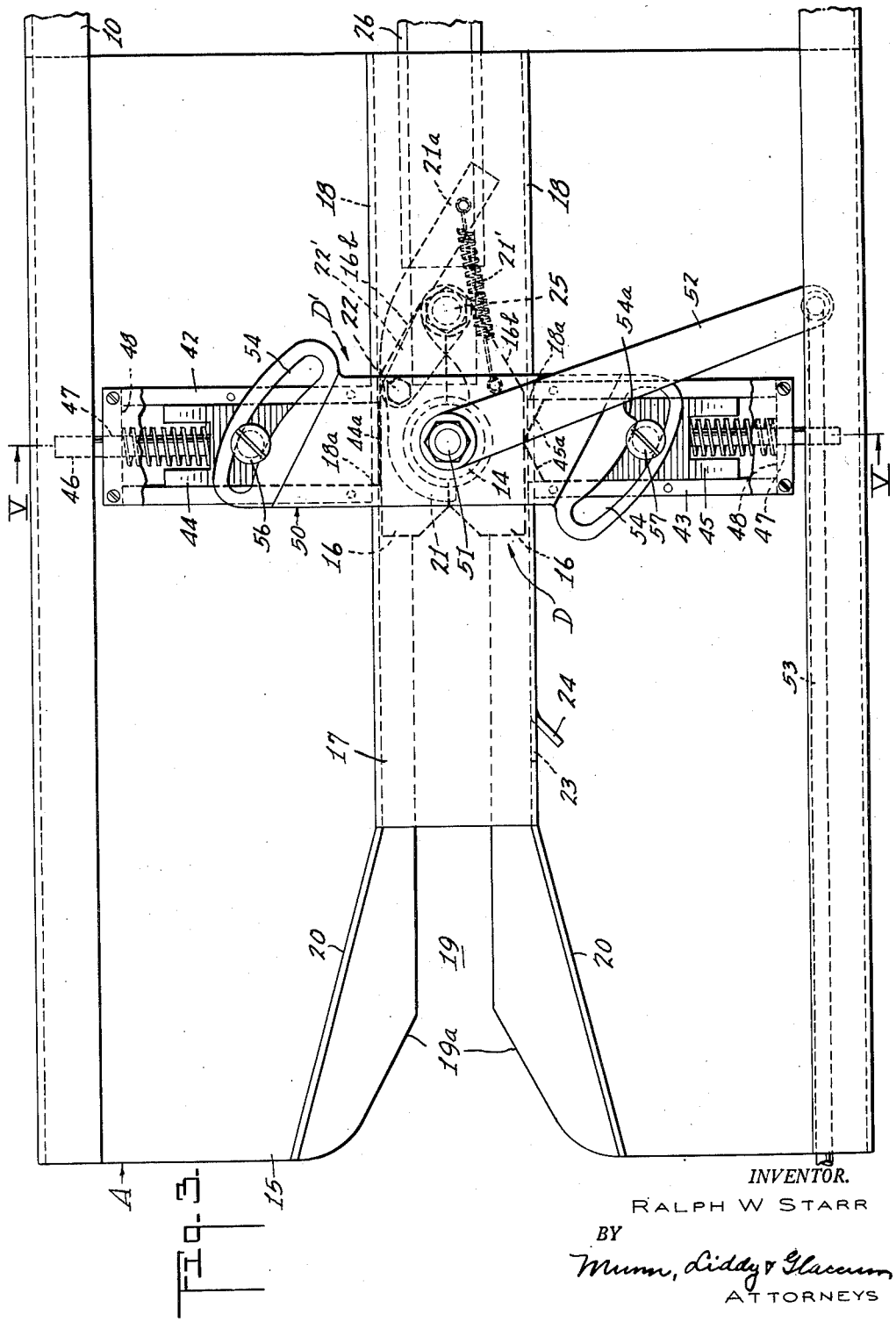

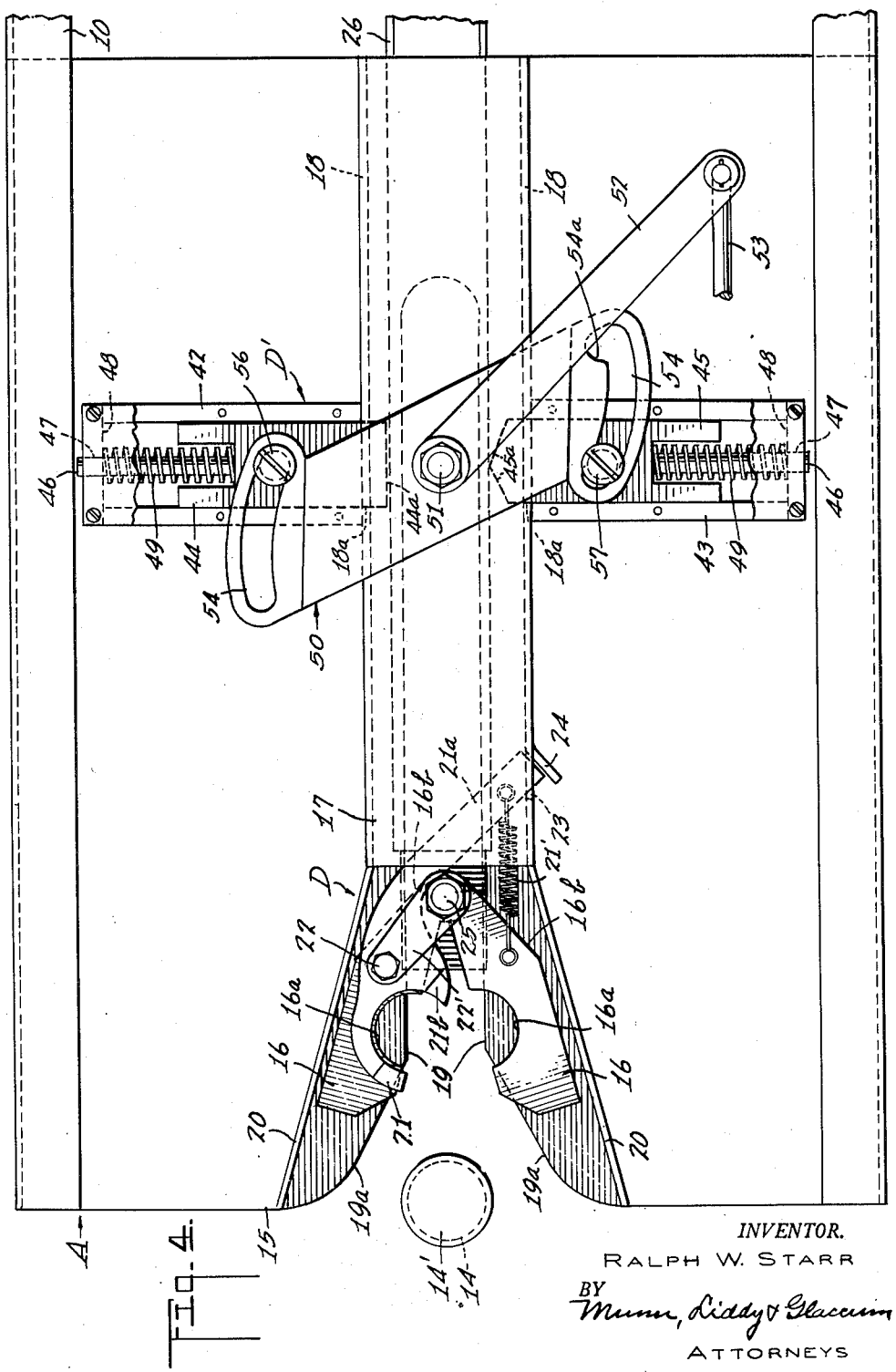

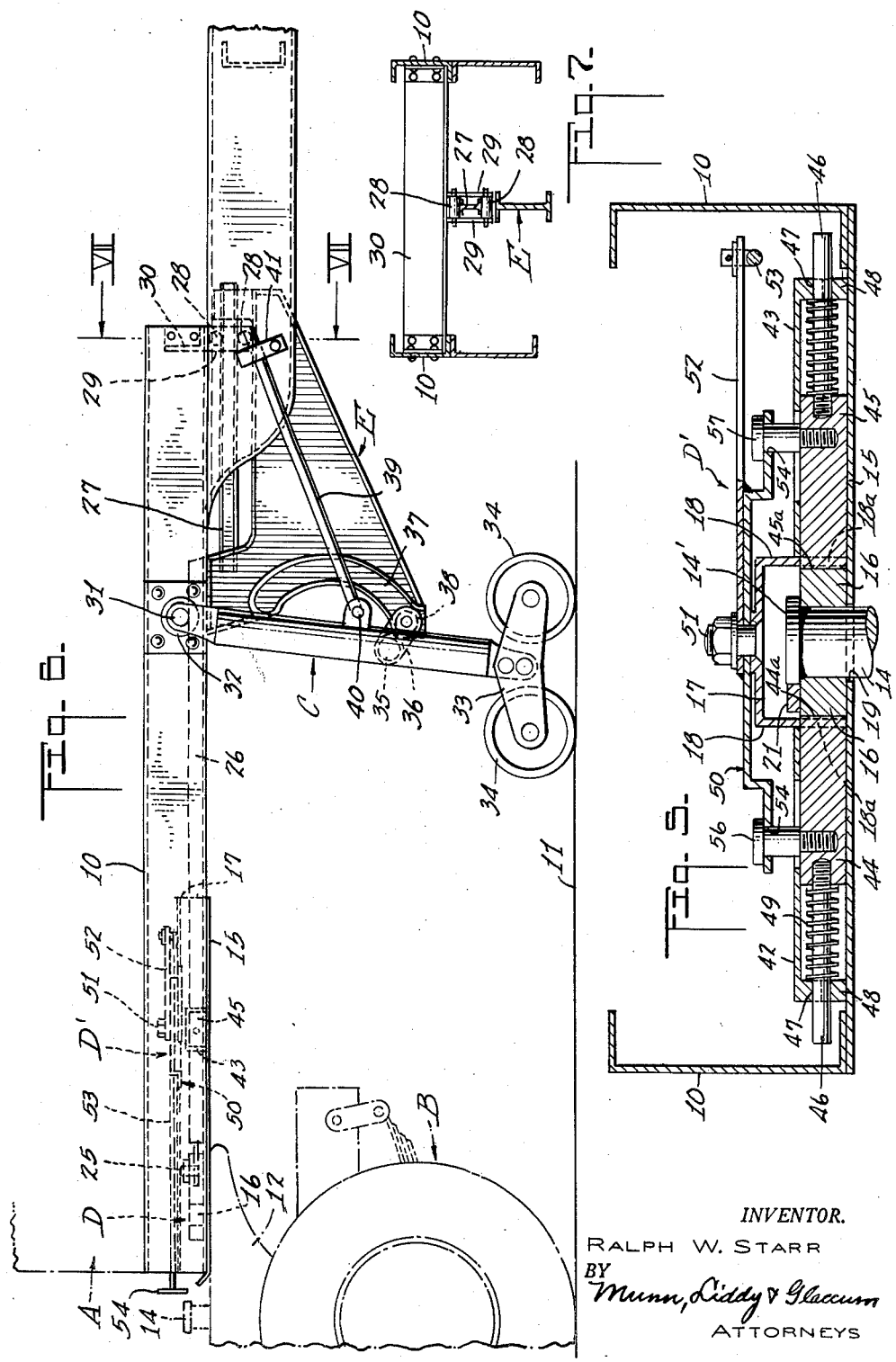

2,515,574

UNITED STATES PATENT OFFICE 2,515,574

LOCKING DEVICE FOR COUPLING SEMI-TRAILERS FOR DRAFT VEHICLES

Ralph Wayne Starr, Yuba City, Calif.

Application June 28, 1949, Serial No. 101,888

8 Claims. (Cl. 280—33.05)

1

The present invention relates to improvements in a locking device for coupling a semi-trailer to a draft vehicle. It consists of the combinations, and arrangement of parts, as hereinafter described and claimed.

This invention embodies improvements over the apparatus shown in my United States Letters Patent No. 2,434,443, granted January 13, 1948, entitled "Full Automatic Landing Legs for Semi-Trailers."

In the above mentioned patent, I disclose retractable legs adapted to support the forward end of a semi-trailer when a draft vehicle is disconnected from the semi-trailer. These legs are retracted when the semi-trailer is coupled to the draft vehicle. This invention has particular reference to the locking device for detachably retaining the semi-trailer coupled to the draft vehicle.

An object of this invention is to provide a locking device for positively holding the semi-trailer coupled to a draft vehicle, which is adapted to be manually released by the driver. During the initial uncoupling of the semi-trailer from the draft vehicle, the locking device will reset itself for automatically interlocking the semi-trailer and the draft vehicle when they are coupled together again.

Moreover, I propose to provide a device of the character described that is simple in construction, durable and efficient for the purpose intended, and positive in action.

Other objects and advantages will appear as the specification continues. The novel features will be set forth in the claims hereunto appended.

For a better understanding of the invention, reference should be had to the accompanying drawings, forming part of the application, in which:

Figure 1 is a plan view of the forward portion of the chassis of a semi-trailer, disclosing the king-pin of a draft vehicle fully coupled to the semi-trailer and secured thereto by my locking device;

Figure 2 is a similar view, but showing the locking device moved to permit withdrawal of the king-pin when the draft vehicle is moved forward from the semi-trailer;

Figure 3 is a view similar to Figure 2, and illustrates the king-pin being pulled forward and the clam jaws on the semi-trailer resetting the locking device;

Figure 4 discloses the next step in which the king-pin of the draft vehicle is fully disconnected from the semi-trailer;

Figure 5 is a transverse vertical sectional view taken along the line V—V of Figure 3;

Figure 6 is a side elevation of the forward part of the semi-trailer supported by the retractable legs, the draft vehicle and its king-pin being shown in dot-dash lines; and

2

Figure 7 is a transverse sectional view taken along the line VII—VII of Figure 6.

While I have shown only the preferred form of my invention, it should be understood that various changes, or modifications, may be made within the scope of the annexed claims without departing from the spirit thereof.

Detailed description

Referring to the drawings, and particularly to Figure 6 thereof, the semi-trailer is designated generally at A. This semi-trailer includes spaced-apart chassis frames 10, the rear portions of which are supported by wheels (not shown) in the conventional manner, well understood in the art. The forward portions of these frames are adapted to be supported by a draft vehicle B when the semi-trailer is coupled thereto for towing purposes. However, when the draft vehicle is detached, the forward portion of the semi-trailer is supported by retractable legs C. The latter are retracted automatically above the roadway 11 when the semi-trailer is fully coupled to the draft vehicle.

The draft vehicle B carries a lower fifth wheel 12 having a king-pin 14 rising therefrom. An upper fifth wheel 15, in the nature of a plate, is secured to the underneath sides of the forward portions of the chassis frames 10. When the draft vehicle is backed under the forward end of the semi-trailer, as suggested in Figure 6, the lower and upper fifth wheels slide over one another in the usual manner.

The semi-trailer is provided with coupling and locking devices D and D', respectively, for detachably engaging with the king-pin 14 of the draft vehicle for coupling the semi-trailer to the draft vehicle. In general, the coupling device includes a clam lock composed of a pair of swingably-mounted coacting jaws 16, which are operable by a reciprocable movement. These jaws slide upon the plate 15, and when they are retracted (moved to the right in Figure 4), they enter a guide member 17. The latter is in the nature of an inverted channel having its flanges 18 welded or otherwise secured to the plate 15.

It will be noted that the plate 15 is fashioned with a slot 19 therein extending lengthwise relative to the semi-trailer and along the centerline of the latter. This slot is dimensioned to receive the king-pin 14 when the draft vehicle is aligned with and backed with respect to the semi-trailer. The forward end of this slot is flared outwardly, as at 19a, to facilitate introduction of the king-pin into the slot. Also, forwardly-diverging upright plates 20 are fixed to the plate 15 and merge into the flanges 18 of the guide member.

The angularity of the plates 20 provide a throat into which the jaws 16 may expand upon pulling them forwardly, thus releasing their grip on the king-pin 14. However, upon retracting the jaws into the guide member 17, due to backing the king-pin into the slot 19 the jaws are moved together by the inclined plates 20 so as to grip the king-pin therebetween. As the king-pin continues to move rearwardly, the jaws move along the guide member until they reach the position shown in Figure 1. At this time, the semi-trailer is fully coupled and locked to the draft vehicle.

In Figure 4, I show the jaws 16 swung into open position and ready to receive the king-pin 14 in the confronting recesses 16a of the jaws. A hook-shaped member or locking dog 21 is pivoted to one of the jaws, as at 22. When the jaws are fully opened, the lever-like end 21a of the member 21 is disposed in an opening 23 formed in one of the flanges 18 and bears against a stop 24 provided on the latter (see Figure 4). A tension spring 22' working between the right-hand jaw 16 and the locking dog 21 holds the jaws open in Figure 4, it being noted that an intermediate portion of the lever end 21a bears against a bolt 25 disposed between the two jaws.

The locking dog holds the jaws in their forward portion and the retractable legs C are held down until the king-pin is forced rearwardly between these jaws. As the king-pin moves rearwardly the head 14' thereof strikes the bil-like end 21b of the member or dog 21, and the lever end 21a is swung in a counter-clockwise direction in Figure 4 so to clear the stop 24. The jaws are relatively heavy, as compared with the dog 21. The lighter weight dog is unlatched before the heavy jaws are pushed rearwardly. The bill 21b is disposed substantially along the center line of the guide member 17, whereas the bolt 25 is disposed to one side. This will facilitate unlatching of the dog. At this time, the jaws are moved into the guide member 17 and are clamped upon the interposed king-pin.

The jaws 16 are hinged by a bolt 25 to the forward end of a reach-bar 26. A link 21' is swingably mounted on the bolts 22 and 25 and aids in supporting the locking dog. The reach-bar is mounted for reciprocable movement along the centerline of the semi-trailer, and has its forward end projecting into the guide member 17. The rear end of this reach-bar has a leg-operating travelling cam E fixed thereto so as to reciprocate therewith.

In order to support the travelling cam E for reciprocation, I secure a rail 27 thereto, and the latter is guided between a pair of rollers 28. These rollers are rotatably mounted in brackets 29 fixed to and depending from an angle iron 30, or the like. This angle iron extends transversely of the semi-trailer and is secured to the chassis frames 10, as clearly disclosed in Figures 6 and 7.

When the jaws 16 occupy their forward position, as in Figures 4 and 6 and are fully opened, the travelling cam E will be disposed at its forward position as in Figure 6. It is obvious that as the reach-bar 26 is pushed rearwardly, due to the king-pin 14 moving the jaws 16 toward the rear, the cam E will be moved in the same direction.

This rear movement of the travelling cam E is utilized for elevating the retractable legs C above the roadway 11 when the forward end of the semi-trailer A is supported on the draft vehicle B. On the other hand, forward movement of the cam E is utilized for extending the legs C into contact with the roadway 11, at which time they constitute support for the forward end of the semi-trailer.

It will be understood that the legs C are duplicated on opposite sides of the chassis frames 10, and are swingably attached thereto at their upper ends by a transverse shaft 31 and bearing journals 32. The lower ends of these legs carry yokes 33 on which ground-engaging wheels 34 are rotatably supported. The legs are interconnected by a transverse brace 35 (see Figure 6). This brace has a pair of arms 36 fixed thereto, which straddle the travelling cam E. The latter has an arcuate guideway 37 fashioned therein, which receives rollers 38 carried by the arms 36.

It will be apparent from Figure 6 that upon moving the travelling cam E rearwardly, the retractable legs C will swing counter-clockwise due to the arcuate guideways 37 acting upon the rollers 38. Accordingly, the wheels 34 will be lifted clear of the roadway 11. The rearward movement of the travelling cam E to elevate the legs C results from the reach-bar 26 and its jaws 16 being forced rearwardly by the king-pin 14.

For the purpose of imparting additional rigidity to the supporting legs C when they are extended, I provide radius rods 39. These rods are hinged to the legs at 40 and slide in swingably-mounted guides 41, which are arranged on the chassis frames of the semi-trailer (see Figure 6).

Referring now to the details of my locking device D', it will be seen that I provide transverse guide members 42 and 43, which are arranged at right angles to the longitudinal guide member 17 and on opposite sides thereof. Locking detents 44 and 45 are slidably disposed in the guide members 42 and 43, respectively. These detents are adapted to be projected through openings 18a fashioned in the flanges 18 of the longitudinal guide member 17. Rods 46 have their inner ends secured to these detents and their outer ends extend through bearing openings 47 provided in end walls 48 of the transverse guide members 42 and 43.

The detents 44 and 45 are yieldingly urged toward one another by springs 49, which encircle the rods 46. When the jaws 16 are retracted rearwardly in the guide member 17 to the position shown in Figure 1, the detents are projected inwardly in front of the jaws 16, thus locking the jaws against being pulled forward relative to the guide member 17 until such time as the detents are retracted again. Accordingly, Figure 1 illustrates the parts of the coupling and locking devices D and D', respectively, in the positions that they occupy when the king-pin 14 is being utilized for towing the semi-trailer A forward with the draft vehicle B.

In order to retract the detents 44 and 45, and thus allow the draft vehicle to be detached, I make use of a manually-swingable cam plate 50. The latter is mounted for movement about a pivot bolt 51, which is anchored to the web of the channel-shaped guide member 17 (see Figure 5). For the purpose of rocking this cam plate, I provide a lever 52, which is fixed to the plate 50. A pull rod 53 is connected to the free end of the lever 52 and extends forwardly therefrom, terminating in a handle 54 that is accessible to the driver or other person. (See Figure 6.)

Referring to Figure 1 in particular, it will be noted that cam slots 54 are provided in the swingable plate 50. These slots are inclined with respect to true arcs 55 of a circle described about the bolt 51. Studs 56 and 57 pass downwardly through the slots 54 and have their lower ends anchored to the locking detents 44—45, respectively (see Figure 5).

As previously stated, Figure 1 illustrates the locking detents 44—45 disposed in front of the retracted jaws 16. Upon pulling the rod 53 forwardly, the lever 52 will swing the cam plate 50 in a clockwise direction. It is apparent that during such swinging of the cam plate the slots 54 and the studs 56—57 will cooperate to retract the locking detents 44—45, respectively, relative to the longitudinal guide member 17. At this time, the parts of the locking device D' will occupy the positions shown in Figure 2.

The cam slot 54 through which the stud 57 projects is provided at one end with a notch 54a, which is arranged to receive the stud 57 when the plate 50 occupies the positions shown in Figure 2. Particular attention is called to the fact that the inner end 44a of the detent 44 has been retracted so as to clear the upper jaw 16 in Figure 2, but the double-tapered inner end 45a of the detent 45 still projects in front of the other jaw 16.

Now the driver commences to move the draft vehicle B forward, and the king-pin 14 will operate to advance the jaws 16 toward the front end of the semi-trailer. This motion, of course, will pull on the reach bar 26 and the travelling cam E will move the retractable legs C until the wheels 34 come into contact with the roadway 11.

During the initial forward movement of the jaws 16 relative to the longitudinal guide member 17, the lower jaw 16 in Figure 3 will cam itself over the inclined ends 45a of the detent 45. This will cause further retraction of the detent 45 in the transverse guide member 43 until the stud 57 backs out of the notch 54a. Inasmuch as the detent 45 is under spring tension, the stud 57 will cooperate with the inclined slot 54 through which the stud 57 extends, causing the cam plate 50 to swing in a counter-clockwise direction until the plate 50 occupies the position shown in Figure 3. This has resulted in "resetting" the locking device D' for snapping the detents in front of the jaws 16 when the latter are subsequently withdrawn to the rear of the detents, as in Figure 1.

In Figure 4, I have disclosed the jaws 16 as being advanced to a point near the forward end of the semi-trailer. As the jaws enter the outwardly flared throat between the forwardly-diverging plates 20, the jaws will move apart, freeing the king-pin 14. Of course, the wheels 34 of the retractable legs C have moved into contact with the roadway 11 by this time and will support the forward end of the semi-trailer.

The back faces 16b of the jaws 16 converge rearwardly and curve around the bolt 25. Thus when the jaws are forced along the guide member 17 toward the back of the semi-trailer A, due to backing of the draft B relative thereto, the jaws will cam themselves between the detents 44—45, urging the latter outwardly to permit passage of the jaws into the fully-coupled position shown in Figure 1.

*Summary of operation*

Having thus described the various parts of my device, the operation thereof is summarized briefly as follows:

Assuming that the forward end of the semi-trailer A is supported by the retractable legs C, as in Figure 6, and that the draft vehicle B is aligned with and is being backed relative to the semi-trailer, the king-pin will enter the slot 19 in the upper fifth wheel plate 15. At this time, the jaws 16 are fully opened, as shown in Figure 4, and are disposed in the throat between the forwardly-diverging plates 20. Also, the lever-like end 21a of the hook-shaped member 21 will project through the opening 23 and rest against the stop 24.

As the king-pin continues to move rearwardly along the slot 19, it will strike the bill-like end 21b of the member 21, swinging the lever end 21a clear of the stop 24. Continued rearward movement of the king-pin and the angularity of the plates 20 will cause the jaws to move toward one another and clamp themselves upon the interposed king-pin as they enter the guide member 17. These jaws will pass between the inner ends 44a—45a of the detents 44—45, urging the latter outwardly, if necessary, to permit passage of the jaws to the rear of the detents.

This rearward movement of the jaws 16 has moved the reach-bar 26 toward the back end of the semi-trailer, operating the travelling cam E to fold the retractable legs C above the roadway 11. Thereupon, the detents will snap toward one another in front of the jaws 16. The parts of the coupling and locking devices D and D', respectively, now occupy the position shown in Figure 1. The semi-trailer A is fully coupled to the draft vehicle B and may be towed away.

When the driver desires to uncouple the semi-trailer A, the handle 54 is pulled forward. This will swing the cam plate 50 into the position shown in Figure 2, with the stud 57 entering the notch 54a to restrain the cam plate 50 from swinging back into the position shown in Figure 1. This has freed the jaws so that they may be pulled forward by withdrawing the draft vehicle and thus advancing the king-pin 14 along the slot 19.

The lower jaw 16 in Figure 2 will contact the rearmost sloping end 45a of the detent 45, forcing the latter outwardly to free the stud 57 from the notch 45a, as clearly disclosed in Figure 3, thus "resetting" the locking device D'. Further advancement of the jaws 16 will move them into the throat between the plates 20. This will permit the jaws to swing outwardly about their pivot bolt 25 until the king-pin 14 is freed from the jaws, as in Figure 4. The lever-like end 21a of the hook-shaped member 21 has reentered the opening 23 to lock the jaws open and retain the legs C extended, the wheels 34 having been lowered into contact with the roadway 11 during the meantime. This completes the uncoupling of the semi-trailer from the draft vehicle.

I claim:

1. In combination: a guide member extending longitudinally of a semi-trailer; a pair of co-operating king-pin-grasping jaws slidable along the guide member; a pair of locking detents disposed on opposite sides of the guide member and having inner ends movable into the interior of the guide member to arrest forward movement of the jaws after the latter have been moved into a position rearwardly of the detents; yielding means urging the detents inwardly of the guide member; a swingably-mounted plate; and means connected to the plate to retract the detents relative to each other when the plate is swung in one direction, and to advance the detents toward each other when the plate is swung in the opposite direction; at least one of the detents have a tapered inner end engageable with one of the jaws for retracting that detent further from in front of said jaw after said detent has been partially withdrawn.

2. In combination: a guide member extending longitudinally of a semi-trailer; a pair of co-operating king-pin-grasping jaws slidable along the guide member; a pair of locking detents disposed on opposite sides of the guide member and having inner ends movable into the interior of the guide member to arrest forward movement of the jaws after the latter have been moved into a position rearwardly of the detents; yielding means urging the detents inwardly of the guide member; a swingably mounted cam plate having slots therein inclined relative to true arcs of a circle described about the pivotal point of the plate; studs secured to the detents and extending into the slots of the cam plate; the slots being inclined and cooperating with the studs to move the detents apart when the cam plate is swung in one direction against the action of said yielding means.

3. In combination: a guide member extending longitudinally of a semi-trailer; a pair of co-operating king-pin-grasping jaws slidable along the guide member; a pair of locking detents disposed on opposite sides of the guide member and having inner ends movable into the interior of the guide member to arrest forward movement of the jaws after the latter have been moved into a position rearwardly of the detents; yielding means urging the detents inwardly of the guide member; a swingably mounted cam plate having slots therein inclined relative to true arcs of a circle described about the pivotal point of the plate; studs secured to the detents and extending into the slots of the cam plate; the slots being inclined and cooperating with the studs to move the detents apart when the cam plate is swung in one direction against the action of said yielding means; at least one of the slots having a notch therein to receive the stud associated therewith when the cam plate has been swung to move the detents apart.

4. In combination; a guide member extending longitudinally of a semi-trailer; a pair of co-operating king-pin-grasping jaws slidable along the guide member; a pair of locking detents disposed on opposite sides of the guide member and having inner ends movable into the interior of the guide member to arrest forward movement of the jaws after the latter have been moved into a position rearwardly of the detents; yielding means urging the detents inwardly of the guide member; a swingably mounted cam plate having slots therein inclined relative to true arcs of a circle described about the pivotal point of the plate; studs secured to the detents and extending into the slots of the cam plate; the slots being inclined and cooperating with the studs to move the detents apart when the cam plate is swung in one direction against the action of said yielding means; at least one of the slots having a notch therein to receive the stud associated therewith when the cam plate has been swung to move the detents apart; the detent associated with the notched slot having a tapered inner end engageable with one of the jaws for retracting that jaw further from in front of said jaw after said detent has been partially withdrawn; the taper of said inner end of that detent being dimensioned to free said stud from the notch when said jaw slides thereover.

5. In combination: a guide member extending longitudinally of a semi-trailer and having an outwardly-flaring throat at its forward end; the guide member having a king-pin receiving extending slot extending rearwardly thereof from its throat; a cam-operating reach-bar reciprocably disposed in the guide member; a pair of coacting clam jaws hinged to the forward end of the reach-bar; the jaws, when disposed in the throat, being swingable away from one another for passage of a king-pin therebetween, with the king-pin movable along the slot; and a locking dog pivotally secured to one of the jaws and having an end swingable into engagement with a stop on the guide member when the jaws are disposed in the throat to retain the reach-bar against rearward movement; the dog having a portion disposed in the path of and movable by the king-pin when the latter is moved rearwardly along the slot for swinging the dog out of engagement with the stop.

6. In combination: a guide member extending longitudinally of a semi-trailer and having an outwardly-flaring throat at its forward end; the guide member having a king-pin receiving extending slot extending rearwardly thereof from its throat; a cam-operating reach-bar reciprocably disposed in the guide member; a pair of coacting clam jaws hinged to the forward end of the reach-bar; the jaws, when disposed in the throat, being swingable away from one another for passage of a king-pin therebetween, with the king-pin movable along the slot; a locking dog pivotally secured to one of the jaws and having an end swingable into engagement with a stop on the guide member when the jaws are disposed in the throat to retain the reach-bar against rearward movement; the dog having a portion disposed in the path of and movable by the king-pin when the latter is moved rearwardly along the slot for swinging the dog out of engagement with the stop; and a tension spring working between one of the jaws and the dog and urging the latter into engagement with the stop.

7. In combination: a reach-bar; a pair of coacting clam jaws hinged to the reach-bar, and arranged to swing toward and away from each other; and a locking dog pivotally secured to one of the jaws at a point laterally of the hinge connection between the jaws; the dog having a hook-shaped end for embracing the head of a king-pin disposed to one side of the pivot of the dog; the dog having a lever-like portion at its other end.

8. In combination: a reach-bar; a pair of coacting clam jaws hinged to the reach-bar, and arranged to swing toward and away from each other; a locking dog pivotally secured to one of the jaws at a point laterally of the hinge connection between the jaws; the dog having a hook-shaped end for embracing the head of a king-pin disposed to one side of the pivot of the dog; the dog having a lever-like portion at its other end; and a tension spring working between the other jaw and the lever-like portion to pull them toward one another.

RALPH WAYNE STARR.

REFERENCES CITED

The following references are of record in the file of this patent:

UNITED STATES PATENTS

| Number | Name | Date |
|---|---|---|
| 1,921,250 | Connors et al. | Aug. 8, 1933 |
| 2,120,509 | Reid | June 14, 1938 |
| 2,246,410 | Wilson | June 17, 1941 |